3,838,123
DIBENZOCYCLOHEPTADIOXOLAN DERIVATIVES
René Viterbo, Paris, France, and Giovanni Brancaccio and Giulio Cesare Perri, Naples, Italy, assignors to Richardson Merrell S.p.A., Naples, Italy
No Drawing. Filed Jan. 26, 1972, Ser. No. 221,048
Claims priority, application Italy, Feb. 5, 1971, 48,220/71; Aug. 4, 1971, 52,112/71
Int. Cl. C07d 87/28
U.S. Cl. 260—247.7 F        10 Claims

ABSTRACT OF THE DISCLOSURE

New cis- and trans-3a,12b-dihydro-8H-dibenzo[3,4:6,7]cyclohepta[1,2-d]-1,3-dioxolan-8-one and cis- and trans-3a,12b-dihydro - 8H - dibenzo[3,4:6,7]cyclohepta[1,2-d]-1,3-dioxolan-8-ol having the following formula (I):

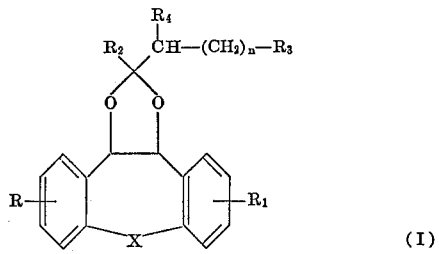

(I)

where X is >C=O or >CHOH; R and $R_1$ are each hydrogen; $R_2$ is hydrogen or alkyl; $R_3$ is dialkylamine, pyrrolidine, piperidine, C-alkylpiperidine, C-dialkylaminopiperidine, C-carbalkoxypiperidine, hexamethylenimine, azabicyclononane, morpholine, piperazine, N'-alkylpiperazine, N'-hydroxyalkylpiperazine, N'-phenylpiperazine, N'-benzylpiperazine, N'-carbalkoxypiperazine; $R_4$ is hydrogen, alkyl or phenyl; and $n$ is a whole integer of from 0 to 2.

The ketocompound of formula I (X=>C=O) are prepared by reacting halocompounds with an amine. The hydroxycompounds of formula I

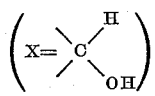

are obtained by reacting the said ketocompound with an alkaline hydride.

The cis- and trans-3a,12b-dihydro-8H-dibenzo[3,4:6,7]cyclohepta[1,2-d]-1,3-dioxolan derivatives described in this invention are useful mainly as anti-inflammatory and anti-spastic agents.

BACKGROUND OF THE INVENTION

The 3a,12b-dihydro - 8H - dibenzo[3,4:6,7]cyclohepta-[1,2-d]-1,3-dioxolane tetracyclic system is already known in the literature. Buchanan, G. L. and Jhaveri, D. B. in the J. Org. Chem., 26, 4295 (1961) describe 3a,12b-dihydro - 2,2 - dimethyl - 8H - dibenzo[3,4:6,7]cyclohepta-[1,2-d]-1,3-dioxolan-8-one, while 3a,12b-dihydro-2-phenyl - 8H - dibenzo[3,4:6,7]cyclohepta[1,2-d]-1,3-dioxolan-8-one is described in the Irish Pats. 645/64 and 1,394/67. Isopropylidenic or benzylidenic compounds have been prepared mainly to protect 10 and 11 hydroxy groups in 10,11-dihydroxy - dibenzocycloheptan-5-one when these compounds are involved in reactions on the 5-keto groups. The compounds of the present invention differ from those in prior art because the chain $(CH_2)_n$—N< in the 2 position of dioxolane, gives new properties to the substances and makes them useful for their pharmacological activities.

DISCLOSURE

The compounds of the present invention are cis- and trans-3a,12b-dihydro - 8H - dibenzo[3,4:6,7]cyclohepta-[1,2-d]-1,3-dioxolan-8-one and cis- and trans-3a,12b-dihydro - 8H - dibenzo[3,4:6,7]cyclohepta[1,2 - d]-1,3-dioxolan-8-ol having the following formula (I):

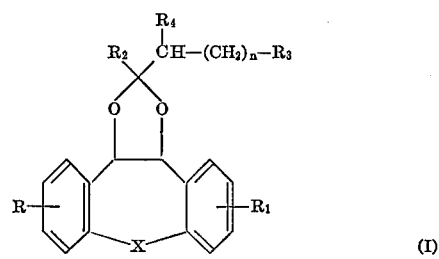

(I)

where X is >C=O or >CHOH; R and $R_1$ are each hydrogen; $R_2$ is hydrogen or alkyl; $R_3$ is dialkylamine, pyrrolidine, piperidine, C-alkylpiperidine, C-dialkylaminopiperidine, C-carbalkoxypiperidine, hexamethylenimine, azabicyclononane, morpholine, piperazine, N'-alkylpiperazine, N'-hydroxyalkylpiperazine, N'-phenylpiperazine, N'-benzylpiperazine, or N'-carbalkoxypiperazine; $R_4$ is hydrogen, alkyl or phenyl; $n$ is a whole integer of from 0 to 2.

In every R definition, alkyl means a chain made by 1 to 4 carbon atoms; whereas in $R_3$ definition, phenyl, benzyl, or pyridyl radicals may be substituted with a substituent selected among halogen, alkyl or alkoxy.

Ammonium salts and organic and inorganic acid addition salts of our compounds are also included within the scope of this invention.

The compounds of formula I in which X is >C=O are prepared by reacting compounds of formula III with an $HR_3$ amine where $R_3$ is according to the above definition. Also, the haloderivatives of formula III are new and have not been heretofore described in the literature. The reaction scheme to prepare the compounds of the invention is as follows:

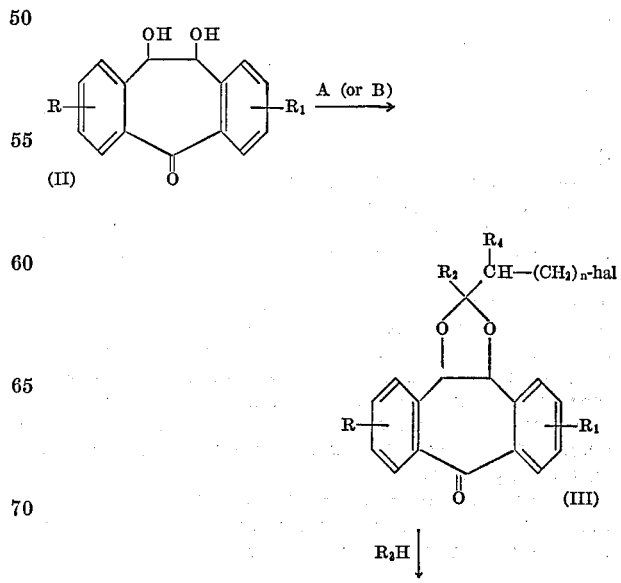

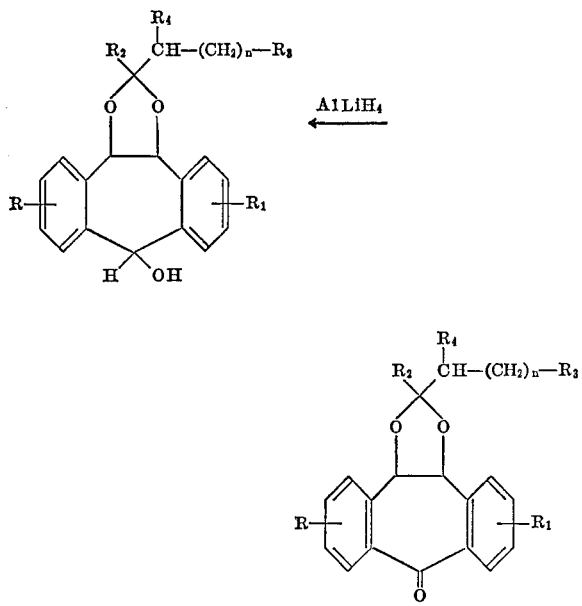

A=(alkyl O)$_2$CR$_2$—CHR$_4$—(CH$_2$)$_n$-halogen
B=O=CR$_2$CHR$_4$—(CH$_2$)$_n$-halogen Cis- and trans- compounds II (R=R$_1$=H) are obtained according to the methods described by Buchanan et Jhaveri (J.O.C., 26, 4295; 1961) and by J. Rigaudy et al. [Bull. Soc. Chim., France, 400 (1960)].

By reacting diol with the suitable haloketones and haloaldehydes or the related haloacetals, we obtain 2-haloalkyldioxolanes of formula III (cis- and trans-). The reaction takes place with or without solvent and in the presence or absence of an acidic catalyst. According to the invention we used aprotic solvents, stable in reaction conditions, such as benzene, toluene or xylene and the like. The temperature of the reaction is a temperature between the room temperature and the boiling point of the solvent used, if the reaction is performed in the presence of a solvent; otherwise between 50° C. and 180° C. if the reaction is performed without solvent. The reaction time depends on the temperature and is between about 60 minutes and 180 hours. The acidic catalyst may be chosen among p-toluenesulphonic acid, sulphuric acid, hydrochloric acid, phosphoric acid, or a Lewis acid.

The reaction mixture is cooled to the room temperature, dried and the residue is purified by crystallization or distillation, or used as such in the further reactions.

By reacting cis- and trans- compounds of formula III, with a primary or secondary amine, according to R$_3$ definition, dissolved in a solvent stable in reaction conditions, we obtain respectively cis- and trans- compounds of formula I, and no isomerization reaction takes place.

Cis- or trans- isomers of formula III react in a different way if the reaction is performed without solvent. Trans- isomers of formula III produce trans- isomers of compounds I, while cis- isomers of formula III produce trans- isomers of compounds I when the reaction is performed in the presence of sole HR$_3$ amine. When solvents are used, we prefer toluene, though we could use also benzene, xylene, and the like. The reaction temperature is in the range between the room temperature and the boiling point of the solvent used, and the reaction time depends on the temperature.

If the reaction is performed without solvent, the reaction mixture is heated at a temperature from 50° to 150° C. for a time from 5 hours to 10 days.

The reaction mixtures are treated as usual to obtain the crude products that are then purified by distillation, crystallization, or chromatography.

To obtain acid addition salts, the compounds are dissolved in ethyl ether, acetone, benzene, toluene, methyl alcohol, ethyl alcohol, and the like and are added to the acid dissolved or not in a solvent chosen among the said ones. The formed salt is filtered, washed and crystallized.

In pharmacological models the compounds of the present invention or their salts showed an interesting anti-inflammatory or antispastic activity; while antipyretic, sedative, myorelaxant, diuretic, choleretic activities may be considered secondary. All the compounds are characterized by having a low toxicity. The pharmacological trials have been performed according to the methods by (1) Spearman-Karber (Finney, D. J.—Statistical method in biological assay—2nd edition, page 524—Griffin and Company, 1964).
(2) Winter, C, A. et al.: Proc. Soc. Exper. Biol. Med., 111, 544 (1962) for anti-inflammatory activity.
(3) Dews, P.: Brit. J. Pharm, 8, 45 (1953) for spontaneous motility.
(4) Kinnard, W. J. et al.: J. Pharm. Exper. Ther., 121, 354 (1957) for myorelaxant activity.
(5) Kagawa, C. et al.: Arch. Int. Pharm. 137, 241 (1962).
(6) Chiancone, F.: Bull. Soc. Ital. Biol. Sper. 25, 676 (1949).

The compounds can be administered internally, for example, orally and parenterally, and can be compounded into different suitable pharmaceutical forms, such as coated tablets, capsules, suppositories, suspensions, solutions and the like. Dosage can be adjusted to individual requirments.

The compounds show a low toxicity. In fact, LD$_{50}$ is higher than 2000 mg./kg./os (Table 1) for most of them. Table 2 shows the results of primary screening performed according to the methods described in the hereinbefore set forth articles.

TABLE 1

LD$_{50}$ wilth confidence limits (CL) (P=0.05) in little mouse per os

| Example: | LD$_{50}$,mg./kg./os |
|---|---|
| 1 | >2,000. |
| 6 | 468 (336 to 651). |
| 7 | >2,000. |
| 8 | 708 (443 to 1,131). |
| 9a | >2,000. |
| 9b | >2,000. |
| 10 | 1,622 (1,057 to 2,488). |
| 11 | >2,000. |
| 12a | 617 (359 to 1,059). |
| 12b | >2,000. |
| 13 | 1,072 (646 to 1,781). |
| 14 | >2,000. |
| 15 | >2,000. |
| 16 | >2,000. |
| 17 | 617 (386 to 985). |
| 18 | >2,000. |
| 21 | 1,862 (1,144 to 3,033). |

Spearman-Karber (Finney, D. J.—Statistical method in biological assay—2nd edition, page 524—Griffin and Company, 1964).

TABLE 2

Anti-inflammatory activity (rat), carrageenan oedema, administration per os, dose=⅕ of LD$_{50}$

| Example: | Percent reduction of oedema |
|---|---|
| 7 | −52.52 |
| 9a | −61.38 |
| 16 | −46.69 |

Spontaneous motility (little mouse), Dews' method, administration per os, dose=⅕ of $LD_{50}$

| Example: | Percent reduction of passages |
|---|---|
| 6 | −53.92 |
| 8 | −51.21 |
| 10 | −60.82 |
| 16 | −46.78 |

Myorelaxing activity (little mouse), Kinnard's method, administration per os, dose=⅕ of $LD_{50}$

| Example: | Percent of fallen animals |
|---|---|
| 10 | 5/10 |

Diuretic activity (rat), Kagawa's method, administration per os, dose=50 mg./kg.

| Example: | Percent increase of diuresis |
|---|---|
| 6 | +187 |
| 16 | +209 |
| 17 | +51 |
| 19 | +269 |

Choleretic activity (rat), Chiancone's method, administration: endodermic, dose=50 mg./kg.

| Example: | Percent increase of biliary flux |
|---|---|
| 19 | +54.84 |

Antispastic activity, isolate organ 'in vitro" (ileum of (guinea-pig), stimulation with $BaCl_2$ ($5.10^{-5}$)

| Example: | $ED_{50}$ (g./ml.) |
|---|---|
| 12a | $1 \times 10^{-6}$ |

Antipyretic activity (rat), method: yeast fever, administration per os, dose ⅕ $LD_{50}$

| Example: | Lowering of body temperature, °C. |
|---|---|
| 9a | −1.0 |

Among the tested compounds the one described in Example 9 has been selected for further studies in anti-inflammatory models as it is more advantageous than the standards; and those described in Examples 25, 26, 27, and 28 have been selected in antispastic models due to a very strong papaverino-like property. Therefore, they can be advantageously used in therapy and administered in mammalians alone or in combination with other active compounds.

The following examples are illustrative of the invention:

EXAMPLE 1

Cis-3a,12b-dihydro-2-bromomethyl-8H-dibenzo[3,4:6,7]cyclohepta[1,2-d]-1,3-dioxolan-8-one A mixture of 26 g. of cis-10,11-dihydroxy-10,11-dihydro - 5H - dibenzo[a,d]cyclohepta - 5 - one and 30 g. bromoacetaldehyde diethylacetal is heated at 175° C. After 1 hour EtOH develops. The reaction mixture is cooled to room temperature and the excess bromoacetal is removed under vacuum. The oily residue is powdered by adding 10 ml. of ethyl ether. 23 g. of cis-3a,12b-dihydro - 2 - bromomethyl - 8H - dibenzo[3,4:6,7]cyclohepta[1,2-d] - 1,3 - dioxolan-8-one are obtained, which can be used as such in the subsequent reactions. It is crystallized from EtOH. M.P. 145–147° C.

EXAMPLE 2

Trans-3a,12b-dihydro-2-(2-bromomethyl)-8H-dibenzo-[3,4:6,7]cyclohepta[1,2-d]-1,3-dioxolan-8-one A mixture of 31 g. of trans-10,11-dihydroxy-10,11-dihydro-5H-dibenzo[a,d]cycloheptan-5-one and 38.10 g. of bromoacetaldehyde diethylacetal is heated to 170–175° C. After about 30 minutes ethanol develops which is then collected by distillation. The reaction occurs within 1 hour. The excess of bromoacetal is removed by distillation and the residue is cooled to room temperature and then powdered with petroleum ether. The yellow solid precipitate is filtered and 42 g. of trans-3a,12b-dihydro-2-(2-bromomethyl) - 8H - dibenzo[3,4:6,7]cyclohepta[1,2-d]-1,3 - dioxolan - 8 - one are obtained and crystallized from ethanol. M.P. 74–76° C.

EXAMPLE 3

Cis-3a,12b-dihydro-2-(α-bromoethyl)-8H-dibenzo[3,4:6,7]cyclohepta[1,2-d]-1,3-dioxolan-8-one A mixture of 3 g. of cis-10,11-dihydroxy-10-11-dihydro-5H-dibenzo[a,d]-cycloheptan-5-one and 3 ml. of α-bromopropionaldehyde diethylacetal is heated to 140° C. until the ethanol is completely distilled off. The cooled reaction mixture is powdered by adding ethyl ether and filtered. 1.6 g. of cis-3a,12b - dihydro - 2 - (α-bromoethyl)-8H-dibenzo[3,4:6,7]cyclohepta[1,2 - d] - 1,3 - dioxo an-8-one are obtained which is crystallized from ethanol. M.P. 116–117° C.

EXAMPLE 4

Cis-3a,12b-dihydro-2-(β-chloroethyl)-8H-dibenzo[3,4:6,7]cyclohepta[1,2-d]-1,3-dioxolan-8-one A mixture of 15.7 g. of cis-10,11-dihydroxy-10,11-dihydro - 5H - dibenzo[a,d]cycloheptan-8-one and 10.8 g. of β-chloropropionaldehyde diethylacetal is heated to 110° C. After 40 minutes EtOH develops and it is collected by distillation. The reaction product is powdered by adding $Et_2O$ obtaining 9.8 g. of cis-3a,12b-dihydro-2-(β-chloroethyl) - 8H - dibenzo[3,4:6,7]cyclohepta[1,2-d]-1,3-dioxolan-8-one which is crystallized from EtOH. M.P. 138–140° C.

EXAMPLE 5

Cis-3a,12b-dihydro-2-methyl-2-bromomethyl-8H-dibenzo-[3,4:6,7]cyclohepta[1,2-d]-1,3-dioxolan-8-one A mixture of 1.7 g. of cis-10,11-dihydro-10,11-dihydroxy-5H-dibenzo[a,d]cycloheptan-5-one and 10 ml. of bromoacetone in 1.2 ml. of $H_2SO_4$ is kept under stirring for 6 hours. The reaction mixture is cooled and poured carefully on 40 g. of $Na_2CO_3$ in 10 ml. of $H_2O$. It is filtered and the solid precipitate is washed with water and crystallized from EtOH. 0.8 g. of cis-3a,12b-dihydro-2-methyl - 2 - bromomethyl - 8H - dibenzo[3,4:6,7]cyclohepta[1,2-d]-1,3-dioxolan-8-one are obtained. M.P. 170–172° C.

EXAMPLE 6

Cis-3a,12b-dihydro-2-[4-methyl-1-piperazinylmethyl]-8H-dibenzo[3,4:6,7]cyclohepta[1,2-d]-1,3-dioxolan-8-one A mixture of 7.6 g. of cis-3a,12b-dihydro-2-(bromomethyl) - 8H - dibenzo[3,4:6,7]cyclohepta[1,2 - d]-1,3-dioxolan-8-one and 4.4 g. of N-methylpiperazine in 70 ml. of toluene is heated to boiling for 12 hours. The reaction mixture is cooled to room temperature and the solid precipitate is removed by filtration. The filtrate is concentrated until dried. The residue is dissolved in 10 ml. of MeOH and then powdered by adding $Et_2O$. 5.5 g. of cis-3a,12b - dihydro-2-[4-methyl-1-piperazinylmethyl]-8H-dibenzo[3,4:6,7]cyclohepta[1,2-d] - 1,3 - dioxolan-8-one are obtained. M.P. 136–138° C.

EXAMPLE 7

Cis-3a,12b-dihydro-2[piperidinomethyl]-8H-dibenzo-[3,4:6,7]cyclohepta[1,2-d]-1,3-dioxolan-8-one A solution of 8 g. of cis-3a,12b-dihydro-2-(bromomethyl) - 8H - dibenzo[3,4:6,7]cyclohepta[1,2-d]1,3-dioxolan-8-one and 4.75 g. piperidine in 50 ml. of toluene is heated to boiling for 15 hours.

The reaction mixture is cooled at room temperature and the solid precipitate is removed by filtration. The filtrate is concentrated until dried; the residue dissolved in 10 ml. of MeOH and then powdered by adding $Et_2O$ gives 5.8 g. of cis-3a,12b - dihydro - 2 - [piperidinomethyl]-8H-dibenzo[3,4:6,7]cyclohepta[1,2-d] - 1,3 - dioxolan-8-one which is crystallized from EtOH. M.P. 136–137° C.

EXAMPLE 8

Trans-3a,12b-dihydro-2-[piperidinomethyl]-8H-dibenzo-[3,4:6,7]cyclohepta[1,2-d]1,3-dioxolan-8-one. HCl A mixture of 12 g. of trans-3a,12b-dihydro-2-[bromomethyl) - 8H - dibenzo[3,4:6,7]cyclohepta[1,2-d]-1,3-dioxolan-8-one and 10 ml. of piperidine is heated to 100° C. for 18 hours. 100 ml. ethyl ether are added to the reaction mixture cooled to room temperature; the solid precipitate is removed by filtration. The filtrate is extracted three times with 20 ml. of 2 N HCl. By alkalizing the acidic solution with solid $K_2CO_3$ we obtain an oil which is extracted with benzene. The benzene solution is dried over anhydrous $Na_2SO_4$, filtered and the solvent is removed under vacuum. The oily residue is dissolved in ethyl ether, and HCl in 2 N EtOH is added to the solution until pH is slightly acid. The precipitate, trans-3a,12b - dihydro - 2 - [piperidinomethyl]-8H-dibenzo-[3,4:6,7]cyclohepta[1,2-d]1,3-dioxolan-8-one hydrochloride, is filtered and washed with EtOH. 10.2 g. of residue are crystallized from EtOH. M.P. 236–238° C.

EXAMPLE 9

Cis-3a,12b-dihydro-2-[morpholinomethyl]-8H-dibenzo-[3,4:6,7]cyclohepta[1,2-d]-1,3-dioxolan-8-one (a) A mixture of 10.9 g. of cis-3a,12b-dihydro-2-(bromomethyl)-8H-dibenzo[3,4:6,7]cyclohepta[1,2 - d]-1,3-dioxolan-8-one and 5.6 ml. of morpholine in 70 ml. of toluene is heated to boiling for 10 hours. The reaction mixture is cooled to room temperature and the solid precipitate which forms is removed by filtration. The filtrate is concentrated until dried. The residue is dissolved in 10 ml. of MeOH and then powdered by adding $Et_2O$. 5.5 g. of cis-3a,12b-dihydro-2-[morpholino-methyl]-8H-dibenzo[3,4:6,7]cyclohepta[1,2-d] - 1,3 - dioxolan-8-one are obtained which is crystallized from EtOH. Methyl iodide. M.P. 229–231° C.

(b) 2 ml. of 2 N HCl in ethanol are added to 1 g. of cis-3a,12b-dihydro-2-[(morpholino) - methyl]-8H-dibenzo[3,4:6,7]cyclohepta[1,2-d]-1,3-dioxolan-8-one dissolved in 8 ml. of absolute EtOH. At once a white solid precipitate separates which is collected by filtration and washed with $Et_2O$. 1.020 g. of vis-3a,12b-dihydro-2-(morpholinomethyl) - 8H - dibenzo[3,4:6,7]cyclohepta[1,2-d]-1,3-dioxolan-8-one hydrochloride are obtained which are crystallized from EtOH. M.P. 214–216° C.

EXAMPLE 10

Trans - 3a,12b-dihydro-2-[morpholinomethyl]-8H-dibenzo[3,4:6,7]cyclohepta[1,2-d]-1,3-dioxolan-8-one hydrochloride A mixture of 13.5 g. of trans-3a,12b-dihydro-2-(bromomethyl) - 8H - dibenzo[3,4:6,7]cyclohepta[1,2-d]-1,3-dioxolon-8-one and 5.9 ml. of morpholine is heated to 100° C. for 16 hours. Ethyl ether is added to the reaction mixture cooled to room temperature, and the precipitate is removed by filtration. The filtrate is concentrated until dried obtaining an oily residue which is powdered with petroleum ether. 6 g. of trans-3a,12b-dihydro-2-[morpholinomethyl] - 8H-dibenzo[3,4:6,7]cyclohepta[1,2-d]-1,3-dioxolan-8-one are obtained. M.P. 56–61° C.

The substance is dissolved in 80 ml. of EtOH and 2 N HCl is added to the clear solution until pH is slightly acid. The hydrochloride which forms is filtered and washed with EtOH and $Et_2O$. Residue=4.5 g. M.P. 238–240° C.

EXAMPLE 11

Cis - 3a,12b-dihydro-2-[(4-phenyl-1-piperazinyl)methyl]-8H-dibenzo[3,4:6,7]cyclohepta[1,2 - d]-1,3-dioxolan-8-one A mixture of 10.350 g. of cis-3a,12b-dihydro-2-(bromomethyl) - 8H - dibenzo[3,4:6,7]cyclohepta[1,2-d]-1,3-dioxolan-8-one and 9.720 g. of phenylpiperazine in 80 ml. of toluene is heated to boiling for 15 hours. The reaction mixture is cooled to room temperature and the solid precipitate is removed by filtration. The filtrate is concentrated until dried. The residue is dissolved in MeOH and then powdered by adding ethyl ether. 10.2 g. of cis-3a,12b-dihydro-2-[(4 - phenyl-1-piperazinyl)methyl]-8H-dibenzo[3,4:6,7]cyclohepta[1,2-d]-1,3-dioxolan-8-one are obtained. M.P. 172–174° C.

EXAMPLE 12

Cis-3a,12b-dihydro-2-[pyrrolidinomethyl]-8H-dibenzo-[3,4:6,7]cyclohepta[1,2-d]-1,3-dioxolan-8-one (a) A mixture of 6.9 g. of cis-3a,12b-dihydro-2-(bromomethyl) - 8H - dibenzo[3,4:6,7]cyclohepta[1,2-d]-1,3-dioxolan-8-one and 3.5 g. of pyrrolidine is heated to boiling for 14 hours. The reaction mixture is cooled to room temperature and the solid precipitate is removed by filtration. The filtrate is concentrated until dried. The residue is dissolved in 10 ml. of MeOH and then powdered by adding $Et_2O$. 3.07 g. of cis-3a,12b-dihydro-2-[pyrrolidinomethyl]-8H-dibenzo[3,4:6,7]cyclohepta[1,2 - d]-1,3-dioxolan-8-one are obtained. M.P. 100–102° C.

(b) Methyl iodide M.P. 244–246° C.

EXAMPLE 13

Cis-3a,12b-dihydro-2-[(4 - benzyl-1-piperazinyl)methyl]-8H-dibenzo[3,4:6,7]cyclohepta[1,2-d] - 1,3 - dioxolan-8-one dimaleate A mixture of 8.635 g. of cis-3a,12b-dihydro-2-bromomethyl-8H-dibenzo[3,4:6,7]cyclohepta[1,2 - d]-1,3-dioxolan-8-one and 8.8 g. of benzylpiperazine in 80 ml. of toluene is heated to boiling for 15 hours. The reaction mixture is cooled to room temperature and the precipitate is removed by filtration. The filtered solution is concentrated until dried. 1.8 g. of maleic acid dissolved in 15 ml. of MeOH are added to the residue dissolved in 30 ml. of MeOH. The white solid precipitate which separates is collected by filtration and washed with MeOH and then $Et_2O$.

6.5 g. of cis-3a,12b-dihydro-2-[(4-benzyl-1-piperazinyl) methyl] - 8H - dibenzo[3,4:6,7]cyclohepta[1,2-d]-1,3-dioxolan-8-one dimaleate are obtained. M.P. 182–184° C.

EXAMPLE 14

Cis-3a,12b-dihydro-2-[(4-o-methoxyphenyl-1-piperazinyl) methyl] - 8H - dibenzo[3,4:6,7]cyclohepta[1,2-d]-1,3-dioxolan-8-one A mixture of 15 g. of cis-3a,12b-dihydro-2-bromomethyl-8H-dibenzo[3,4.:6,7]cyclohepta[1,2 - d]-1,3-dioxolan-8-one and 16.6 g. of o-methoxyphenyl piperazine in 120 ml. of toluene is heated to boiling for 18 hours. The reaction mixture is cooled at room temperature and the solid precipitate is removed by filtration. The filtrate is concentrated until dried. The residue is dissolved in MeOH and then powdered by adding $Et_2O$. 14.6 g. of cis-3a,12b-dihydro-2-[(4 - o - methoxyphenyl-1-piperazinyl) methyl] - 8H - dibenzo[3,4:6,7]cyclohepta[1,2-d]-1,3-dioxolan-8-one are obtained. M.P. 168–170° C.

EXAMPLE 15

Trans-3a,12b-dihydro-2-[(4 - o - methoxyphenyl-1-piperazinyl)methyl]-8H-dibenzo[3,4:6,7]cyclohepta[1,2 - d]-1,3-dioxolan-8-one A mixture of 10 g. of trans-3a,12b-dihydro-2-(bromomethyl) - 8H - dibenzo[3,4:6,7]cyclohepta[1,2-d]-1,3-dioxolan-8-one and 11 g. of o-methoxyphenyl piperazine is heated at 110° C. for 15 hours. Benzene is added to the reaction mixture cooled to room temperature and the solid precipitate which forms is removed by filtration. The filtrate washed three times with 30 ml. of water until neutral pH is extracted with N HCl solution. From the aqueous acid solution alkalized with solid K₂CO₃ an oil separates which is extracted with benzene. This benzene solution is dried over anhydrous Na₂SO₄, filtered, and the solvent is removed under vacuum. 5.280 g. of a solid yellowish precipitate are obtained, formed by trans-3a,12b-dihydro-2-[(o-methoxyphenyl - 1 - piperazinyl)methyl]-8H-dibenzo[3,4:6,7]cyclohepta[1,2-d] - 1,3 - dioxolan-8-one which is crystallized from benzene. M.P. 137–139° C.

EXAMPLE 16

Cis-3a,12b-dihydro-2-[(o - methylpiperidino)methyl]-8H-dibenzo[3,4:6,7]cyclohepta[1,2-d]-1,3-dioxolan-8-one A mixture of 13.8 g. of cis-3a,12b-dihydro-2-bromomethyl-8H-dibenzo[3,4:6,7]cyclohepta[1,2 - d]-1,3-dioxolan-8-one and 7.64 g. of 2-methylpiperidine in 60 ml. of toluene is heated to boiling for 15 hours. The reaction mixture is cooled to room temperature and the solid precipitate which forms is removed by filtration. The filtrate is concentrated until dried. The residue is dissolved in 10 ml. of MeOH and then powdered by adding Et₂O. 10.750 g. of cis-3a,12b-dihydro-2-[(o-methylpiperidino)methyl] - 8H - dibenzo[3,4:6,7]cyclohepta[1,2-d]-1,3-dioxolan-8-one are obtained. M.P. 154–156° C.

EXAMPLE 17

Cis - 3a,12b-dihydro-2-[(4-β-hydroxyethyl-1-piperazinyl)methyl] - 8H - dibenzo[3,4:6,7]cyclohepta[1,2-d]-1,3-dioxolan-8-one dihydrochloride A mixture of 15 g. of cis-3a,12b-dihydro-2-bromomethyl-8H-dibenzo[3,4:6,7]cyclohepta[1,2-d] - 1,3 - dioxolan-8-one and 11.180 g. of β-hydroxyethylpiperazine in 100 ml. of toluene is heated to boiling for 15 hours. The reaction mixture is cooled to room temperature and the solid precipitate is removed by filtration. The filtrate is concentrated until dried. The oily residue is dissolved in 30 ml. of EtOH and HCl in ethanol is added to the clear solution until acid pH. The solid precipitate which separates is collected by filtration and washed with Me₂CO and Et₂O. 13 g. of cis-3a,12b-dihydro-2-[(4-β-hydroxyethyl-1-piperazinyl)methyl] - 8H - dibenzo[3,4:6,7]cyclohepta[1,2-d] - 1,3 - dioxolan-8-one dihydrochloride. M.P. 212–214° C.

EXAMPLE 18

Cis-3a,12b-dihydro-2-(diethylaminomethyl)-8H-dibenzo[3,4:6,7]cyclohepta[1,2-d]-1,3-dioxolan-8-one A mixture of 15 g. of cis - 3a,12b - dihydro-2-(bromomethyl) - 8H - dibenzo[3,4:6,7]cyclohepta[1,2 - d] - 1,3-dioxolan - 8 - one and 35 ml. of diethylamine in 100 ml. of toluene is heated in a sealed tube for 6 days at 100° C. The reaction mixture is washed with H₂O and then extracted with N HCl. The aqueous acid solution is made alkaline by adding solid K₂CO₃; an oil separates which is extracted with benzene. The benzene solution is dried on Na₂SO₄, filtered and concentrated under vacuum. 8 g. of cis - 3a,12b - dihydro-2-(diethylaminomethyl) - 8H - dibenzo[3,4:6,7]cyclohepta[1,2-d]-1,3 - dioxolan - 8-one are obtained which are crystallized from an ether-petroleum ether mixture (2:1). M.P. 59–61° C.

EXAMPLE 19

Cis - 3a,12b - dihydro-2-(2-morpholinoethyl)-8H-dibenzo[3,4:6,7]cyclohepta[1,2 - d] - 1,3 - dioxolan-8-one hydrochloride A mixture of 15 g. of cis - 3a,12b-dihydro-2-(2-chloroethyl) - 8H - dibenzo[3,4:6,7]cyclohepta[1,2 - d] - 1,3-dioxolan-8-one and 11 ml. of morpholine in 100 ml. of toluene is refluxed for 62 hours. The reaction mixture is filtered and the filtrate is washed with water until neutral pH. The toluene solution is dried on anhydrous Na₂SO₄, filtered and the solvent is removed by vacuum distillation. An oil is obtained (11 g.) which is dissolved in ethyl ether (50 ml.) and acidified with 22 ml. of ethanolic solution of N HCl. The mixture is left to settle for 5 hours. The precipitate collected by filtration is washed with EtOH and then with Et₂O. 12.4 g. of cis-3a,12b-dihydro-2-(2-morpholinoethyl) - 8H - dibenzo[3,4:6,7]cyclohepta[1,2-d]-1,3-dioxolan-8-one hydrochloride are obtained which are crystallized from EtOH. M.P. 224–226° C.

EXAMPLE 20

Trans-3a,12b-dihydro-2-(pyrrolidinomethyl)-8H-dibenzo[3,4:6,7]cyclohepta[1,2-d]-1,3-dioxolan-8-one A mixture of 18 g. of trans-3a,12b-dihydro-2-bromomethyl - 8H - dibenzo[3,4:6,7]cyclohepta[1,2 - d] - 1,3-dioxolan-8-one and 15 ml. of pyrrolidine in 80 ml. of toluene is refluxed for 36 hours. The reaction mixture is cooled and washed with H₂O until neutral pH, then it is extracted with 2 N HCl. The aqueous acid solutions are alkalized with solid K₂CO₃ and extracted with benzene. The benzene solution is washed with water, dried over Na₂SO₄ and concentrated under vacuum. A solid precipitate is obtained, it is trans-3a-12b-dihydro-2-(pyrrolidinomethyl) - 8H - dibenzo[3,4:6,7]cyclohepta[1,2 - d]-1,3-dioxolan-8-one which is crystallized from EtOH. M.P. 134–135° C.

EXAMPLE 21

Cis - 3a,12b - dihydro-2-(hexamethyleniminemethyl)-8H-dizenzo[3,4:6,7]cyclohepta[1,2 - d] - 1,3-dioxolan - 8-one methyl iodide A mixture of 9 g. of cis - 3a,12b - dihydro-2-bromomethyl - 8H - dibenzo[3,4:6,7]cyclohepta[1,2 - d] - 1,3-dioxolan-8-one and 5.12 g. of hexamethylenimine in 70 ml. of toluene is heated to 110° C. for 15 hours. The reaction mixture is filtered and the filtrate is concentrated under vacuum. The oily residue is dissolved in 10 ml. of ethyl ether and 5 ml. of methyl iodide are added. It is left at room temperature for 3 hours, then the solid which separates is collected by filtration and washed with acetone and Et₂O. The product is crystallized twice by MeOH, obtaining 3.5 g. of cis-3a,12b-dihydro-2-(hexamethyleniminemethyl) - 8H - dibenzo[3,4:6,7]cyclohepta[1,2-d]-1,3-dioxolan-8-one methyl iodide. M.P. 223–225° C.

EXAMPLE 22

Cis - 3a,12b - dihydro - 2 - [4-carboethoxy-1-piperazinylmethyl] - 8H - dibenzo[3,4:6,7]cyclohepta[1,2 - d]-1,3-dioxolan-8-one hydrochloride A mixture of 13.8 g. of cis-3a,12b-dihydro-2-(bromomethyl) - 8H - dibenzo[3,4:6,7]cyclohepta[1,2 - d]-1,3-dioxolan-8-one and 12.7 g. of 4-carboethoxy piperazine in 60 ml. of toluene is heated to boiling. The reaction mixture is cooled and then filtered to remove the formed solid.

The filtered solution is stirred with H₂O to neutral and concentrated to dryness. The oily residue is dissolved in MeOH and acidified with 2 N HCl in EtOH to slightly acid pH. The separated solid is collected by filtration and washed with Et₂O. 6.8 g. of cis-3a,12b-dihydro-2-[4-carboethoxy - 1 -piperazinylmethyl] - 8H - dibenzo[3,4:6,7]cyclohepta[1,2 - d]-1,3-dioxolan-8-one hydrochloride are obtained. M.P. 189–193° C. It is crystallized from EtOH. M.P. 192–194° C.

EXAMPLE 23

Cis - 3a,12b - dihydro - 2 - [(4 - carbethoxypiperidino)methyl] - 8H - dibenzo[3,4:6,7]cyclohepta[1,2-d]-1,3-dioxolan-8-one A mixture of 18 g. of cis - 3a,12b - dihydro-2-(bromomethyl) - 8H - dibenzo[3,4:6,7]cyclohepta[1,2 - d]-1,3-dioxolan-8-one and 16.5 g. of 4-carbethoxypiperidine in 150 ml. of toluene is heated to boiling for 36 hours. The reaction mixture is cooled to room temperature and the formed solid is removed by filtration. The filtered solution is concentrated under vacuum to dryness. The residue is powdered by adding Et$_2$O. 17 g. of cis-3a,12b-dihydro-2-[(4 - carbethoxypiperidino)methyl]-8H-dibenzo[3,4:6,7]cyclohepta[1,2-d]-1,3-dioxolan-8-one are obtained which are crystallized from EtOH. M.P. 100–101° C.

EXAMPLE 24

Cis - 3a,12b - dihydro - 2-[(4-dimethylaminopiperidino)methyl] - 8H - dibenzo[3,4:6,7]cyclohepta[1,2-d]-1,3-dioxolan-8-one A mixture of 9 g. of cis - 3a,12b - dihydro-2-(bromomethyl) - 8H - dibenzo[3,4:6,7]cyclohepta[1,2 - d]-1,3-dioxolan-8-one and 7 g. of 4-dimethylamino piperidine in 70 ml. of toluene is heated to boiling for 20 hours. The reaction mixture is cooled to room temperature and filtered to remove the formed solid. The filtered solution is concentrated at lowered pressure to dryness. The residue is treated with Et$_2$O. 6.8 g. of cis-3a,12b-dihydro-2-[(4-dimethylaminopiperidino)methyl] - 8H-dibenzo[3,4:6,7]cyclohepta[1,2-d]-1,3-dioxolan-8-one are obtained which are crystallized from CH$_3$COOEt. M.P. 134–135° C.

EXAMPLE 25

Cis - 3a,12b - dihydro-2-(2-piperidinoethyl)-8H-dibenzo [3,4:6,7]cyclohepta[1,2 - d]-1,3-dioxolan-8-one hydrochloride A mixture of 22 g. of cis-3a,12b-dihydro-2-($\beta$-chloroethyl) - 8H - dibenzo[3,4:6,7]cyclohepta[1,2 - d] - 1,3-dioxolan-8-one and 20 ml. of piperidine in 100 ml. of toluene is heated to boiling for 64 hours. The reaction mixture is cooled to room temperature and the solid precipitate is removed by filtration. The filtered solution is washed with water to neutral pH. Then it is dried and concentrated under vacuum. The oily residue is dissolved in ethyl ether. The ethereal solution is added to 30 ml. of an ethanolic solution of 1.8 N HCl. The solid precipitate which forms is collected by filtration and washed with acetone and ethyl ether. 12 g. of a solid having M.P. 236–240° C. is obtained. By cooling 5 g. of cis-3a,12b-dihydro - 2 - (2 - piperidinoethyl)-8H-dibenzo[3,4:6,7]cyclohepta[1,2 - d]-1,3-dioxolan-8-one hydrochloride are obtained. M.P. 264–266° C.

EXAMPLE 26

Cis - 3a,12b - dihydro-2[$\beta$-(4-mehyl-1-piperazinyl)ethyl]-8H - dibenzo[3,4:6,7]cyclohepta[1,2-d] - 1,3 - dioxolan-8-one A mixture of 14 g. of cis - 3a,12b - dihydro - 2 - ($\beta$-chloroethyl) - 8H - dibenzo[3,4:6,7]cyclohepta[1,2-d]-1,3 - dioxolan - 8 - one and 9.2 g. of 4 - methylpiperazine in 70 ml. of toluene is heated to boiling for 60 hours. The reaction mixture is cooled to room temperature and filtered to remove the solid precipitate. The filtered solution is evaporated under vacuum to complete removal of the solvent, and the obtained oil is dissolved in Et$_2$O. The ethereal solution is mixed with 40 ml. of an ethanolic solution of 1.8 N HCl. The solid precipitate is filtered and washed with Me$_2$CO and Et$_2$O, and finally crystallized from EtOH. 11 g. of cis - 3a,12b - dihydro - 2 -[$\beta$-(4-methyl - 1 - piperazinyl)ethyl] - 8H - dibenzo[3,4:6,7]cyclohepta[1,2-d]-1,3-dioxolan - 8 - one hydrochloride are obtained. M.P. 208–210° C.

EXAMPLE 27

Trans - 3a,12b - dihydro - 2 - [(4-methyl-1-piperazinyl)methyl] - 8H - dibenzo[3,4:6,7]cyclohepta[1,2-d]-1,3-dioxolan-8-one dihydrochloride A mixture of 18 g. of trans - 3a,12b - dihydro-2-(bromomethyl) - 8H - dibenzo[3,4:6,7]cyclohepta[1,2-d] - 1,3-dioxolan - 8 - one and 10.8 g. of 4-methylpiperazine in 70 ml. of toluene is heated under stirring for 36 hours. The cooled reaction mixture is filtered to remove the solid. The filtered solution is concentrated under vacuum to dryness. The residue is powdered with Et$_2$O. 9.5 g. of trans-3a,12b - dihydro - 2 - [(4 - methyl-1-piperazinyl)methyl]-8H - dibenzo[3,4:6,7]cyclohepta[1,2-d] - 1,3 - dioxolan-8 - one are obtained. M.P. 99–101° C. An ethanolic solution of 9.5 g. is dissolved in 25 ml. of an alcoholic solution of 1.8 N HCl. The solid which forms is filtered and washed with EtOH and Et$_2$O. Yield 9.4 g. of trans-3a,12b-dihydro - 2 - [(4 - methyl - 1 - piperazinyl)methyl]-8H-dibenzo[3,4:6,7]cyclohepta[1,2-d] - 1,3 - dioxolan-8-one dihydrochloride. M.P. 261–263° C.

EXAMPLE 28

Trans - 3a,12b - dihydro - 2 - [(4-benzyl-1-piperazinyl)methyl] - 8H - dibenzo[3,4:6,7]cyclohepta[1,2-d]-1,3-dioxolan-8-one hydrochloride A mixture of 12 g. of trans - 3a,12b - dihydro - 2-(bromomethyl) - 8H-dibenzo[3,4:6,7]cyclohepta[1,2-d]-1,3 - dioxolan - 8 - one and 11.97 g. of benzylpiperazine is heated at 110° C. for 15 hours. The cooled reaction mixture is added to 150 ml. of benzene then it is filtered to remove the precipitate. The filtered solution is added to water to reach neutral pH, it is dried over Na$_2$SO$_4$ and finally concentrated under vacuum. The obtained residue is diluted in 50 ml. of ethyl alcohol and the solution is added to 45 ml. of an ethnaolic solution of 1.8 N HCl. The solid which forms is collected by filtration and 14.8 g. of trans - 3a,12b - dihydro - 2 - [(4-benzyl-1-piperazinyl)-methyl] - 8H - dibenzo[3,4:6,7]cyclohepta[1,2-d] - 1,3-dioxolan-8-one hydrochloride are obtained. M.P. 260–262° C.

EXAMPLE 29

Trans - 3a,12b - dihydro - 2 - [(4-p-chlorophenyl-1-piperazinyl)methyl] - 8H - dibenzo[3,4:6,7]cyclohepta[1,2-d]-1,3-dioxolan-8-one A mixture of 12 g. of trans - 3a,12b - dihydro - 2-(bromomethyl) - 8H-dibenzo[3,4:6,7]cyclohepta[1,2-d]-1,3-dioxolan-8-one and 13.3 g. of p-chlorophenylpiperazine is heated at 120° C. for 15 hours. The cooled reaction mixture is added to 200 ml. of benzene and filtered to remove the precipitate. The filtered solution is stirred with water to neutral pH, dried over Na$_2$SO$_4$ and concentrated to complete evaporation of the solvent. The solid residue is crystallized from benzene; 8.2 g. of trans-3a,12b - dihydro - 2 - [(4-p-chlorophenyl-1-piperazinyl)methyl]-8H-dibenzo[3,4:6,7]cyclohepta[1,2-d] - 1,3 - dioxolan-8-one are obtained. M.P. 166–168° C.

EXAMPLE 30

Trans - 3a,12b - dihydro - 2 - ($\beta$-diethylaminomethyl)-8H - dibenzo[3,4:6,7]cyclohepta[1,2-d]dioxolan-8-one hydrochloride A mixture of 15 g. of trans - 3a,12b - dihydro-2-(bromomethyl) - 8H - dibenzo[3,4:6,7]cyclohepta[1,2-d] dioxolan-8-one, 70 ml. of diethylamine and 130 ml. of benzene is heated under stirring at 100° C. for 7 days. The cooled reaction mixture is diluted with benzene, washed with water and then with 2 N HCl. The acidic solution is made alkaline by adding Na$_2$CO$_3$. The oil which separates is extracted with ethyl ether. The diluted ethereal extracts are concentrated to dryness. The oily residue is dissolved in petroleum ether. To the limpid solution an ethanolic solution of 1.6 N HCl is added. It is diluted with 200 ml. of ethyl ether and left to settle for 30 minutes. The solid which forms is removed by filtration. 9.7 g. of trans-3a,12b - dihydro - 2 - ($\beta$-diethylaminomethyl) - 8H - dibenzo[3,4:6,7]cyclohepta[1,2-d] - 1,3 - dioxolan-8-one hydrochloride are obtained which are crystallized from ethanol. M.P. 190–192° C.

EXAMPLE 31

Cis - 3a,12b - dihydro - 2 - (α-morpholinoethyl)-8H-dibenzo[3,4:6,7]cyclohepta[1,2-d] - 1,3 - dioxolan-8-one hydrochloride A mixture of 15 g. of cis - 3a,12b - dihydro - 2 - (α-bromoethyl) - 8H - dibenzo[3,4:6,7]cyclohepta[1,2-d]-1,3 - dioxolan - 8 - one and 20 ml. of morpholine is heated at 110° C. for 18 hours. The exceeding morpholine is removed under vacuum then ethyl ether is added to the reaction mixture. The solid precipitate is discarded by filtration and the filtered solution is washed with water, then with 2 N HCl. The acidic solution is made alkaline by adding $K_2CO_3$ powder, the oil which forms is extracted with benzene. The benzenic solution is concentrated under vacuum to dryness. The oily residue is dissolved in ethyl ether and an ethanolic solution of 1.6 N HCl is added to reach a slightly acid pH. The solid compound is filtered and crystallized from ethanol. 4.2 g. of cis - 3a,12b - dihydro - 2 - (α - morpholinoethyl) - 8H - dibenzo[3,4:6,7]cyclohepta[1,2-d] - 1,3 - dioxolan - 8 - one hydrochloride are obtained. M.P. 204–206° C.

EXAMPLE 32

Trans - 3a,12b - dihydro - 2 - (pyrrolidinomethyl)-8H-dibenzo[3,4:6,7]cyclohepta[1,2-d]-1,3-dioxolan-8-one A mixture of 15 g. of cis - 3a,12b - dihydro-2-(bromomethyl) - 8H - dibenzo[3,4:6,7]cyclohepta[1,2-d]-1,3-dioxolan-8-one and 10 ml. of pyrrolidine is heated at 100° C. for 16 hours. Benzene is added and the benzenic solution is washed with water and then with 2 N HCl. The acidic solution is made alkaline by adding $K_2CO_3$ powder and the separated oil is extracted with benzene. The benzenic solution is concentrated under vacuum to dryness. The residue is powdered by adding $Et_2O$ and collected by filtration. 5.8 g. of a solid compound are obtained which are crystallized from MeOH. 4.120 g. of trans - 3a,12b - dihydro - 2 - (pyrrolidinomethyl)-8H-dibenzo[3,4:6,7]cyclohepta[1,2-d] - 1,3 - dioxolan - 8-one are obtained. U.V. and I. R. spectra, and M.P. are equal to those of a sample prepared according to Example 20.

EXAMPLE 33

Trans-3a,12b-dihydro-2-[(4-dimethylamino-1-piperidinyl)methyl] - 8H - dibenzo[3,4:6,7]cycloheptal[1,2-d]-1,3-dioxolan-8-one dihydrochloride A mixture of 14 g. of trans - 3a,12b - dihydro - 2 - (bromomethyl) - 8H - dibenzo[3,4:6,7]cycloheptal[1,2-d]-1,3-dioxolan-8-one and 11.4 g. of 4-dimethylaminopiperidine is heated at 110° C. for 14 hours. To the cooled reaction mixture benzene is added and the undissolved solid is removed by filtration. The filtrate is stirred with water and then with 2 N HCl. The acid solution is made alkaline by adding $K_2CO_3$ solid and the oily precipitate is extracted with benzene. The benzenic extracted is dried over $Na_2SO_4$ and concentrated to dryness. The oily residue is treated with 30 ml. of 1.8 N HCl ethanolic solution. The formed precipitate, trans - 3a,12b - [(4-dimethylamino - 1 - piperidinyl)methyl] - 8H - dibenzo[3,4:6.7]cyclohepta[1,2 - d] - 1,3 - dioxolan - 8 - one dihydrochloride (8.76 g.) is filtered and recrystallized from methanol. M.P. 272–273° C.

EXAMPLE 34

Trans-3a,12b-2-[(3-azabicyclo[3,2,2]nonan-3-yl)methyl]-8H - dibenzo[3,4:6,7]cycloheptal[1,2 - d] - 1,3 - dioxolan-8-one hydrochloride A mixture of 14 g. of trans-3a,12b-dihydro-2-(bromomethyl) - 8H - dibenzo[3,4:6,7]cyclohepta[1,2 - d]dioxolan-8-one and 12.1 g. of 3-azabicyclo[3,2,2]nonane is heated at 110° C. for 18 hours. To the cooled reaction mixture water is added, then benzene. The organic layer is separated and dried over $Na_2SO_4$. The solution is concentrated to dryness under vacuum and the oily residue is treated with 100 ml. of N HCl. The formed solid is filtered and crystallized from methanol; 9.8 g. of trans-3a,12b-dihydro - 2 - [(3 - azabicyclo[3,2,2]nonan - 3 - yl)methyl] - 8H - dibenzo[3,4:6,7]cyclohepta[1,2 - d] - 1,3-dioxolan-8-one hydrochloride are obtained. M.P. 262–264° C.

EXAMPLE 35

Cis-3a,12b-dihydro-2-(morpholinomethyl)-8H-dibenzo [3,4:6,7]cyclohepta[1,2-d]-1,3-dioxolan-8-ol 6 g. of cis - 3a,12b - dihydro - 2 - (morpholinomethyl)-8H - dibenzo[3,4:6,7]cyclohepta[1,2 - d] - 1,3 - dioxolan-8-one in 130 ml. of anhydrous benzene are added slowly and stirring to 0.6 g. of $AlLiH_4$ suspended in 50 ml. of anhydrous $Et_2O$. The mixture cooled to room temperature is refluxed for 8 hours and the solid precipitate in suspension is collected by filtration and washed with ethyl ether. Then it is dissolved in 250 ml. of MeOH and the solution is filtered. The clear obtained solution is concentrated to 50 ml. volume. The solid precipitate which separates is filtered and washed with $Et_2O$. 4.6 g. of cis-3a,12b - dihydro - 2 - (morpholinomethyl) - 8H-dibenzo [3,4:6,7]cyclohepta[1,2 - d] - 1,3 - dioxolan - 8 - one are obtained. M.P. 215–217° C.

EXAMPLE 36

Cis-3a,12b-dihydro-2-[(4-o-methoxyphenyl-1-piperazinyl) methyl] - 8H - dibenzo[3,4:6,7]cycloheptal[1,2 - d]-1,3-dioxolan-8-ol 6 g. of cis - 3a,12b - dihydro - 2 - [(4 - o - methoxyphenyl - 1 - piperazinyl)methyl] - 8H - dibenzo[3,4:6,7]cyclohepta[1,2 - d] - 1,3 - dioxolan - 8 - one in 150 ml. of anhydrous benzene are added slowly and by stirring within 20 minutes, to 0.8 g. of $AlLiH_4$ suspended in 50 ml. of anhydrous ethyl ether. The mixture is refluxed for 7 hours. First, 15 ml. of ethyl acetate, then 8 ml. of $H_2O$ are added slowly to the reaction mixture which had been cooled to room temperature. The solid precipitate is filtered and washed with hot benzene (3 times with 100 ml.). The filtrate and the washing benzene together are concentrated to 70 ml. volume. A white solid precipitate separates which is collected by filtration and washed with MeOH first, then with $Et_2O$. 3.8 g. of cis-3a,12b-dihydro-2 - [4 - o - methoxyphenyl - 1 - piperazinyl)methyl]-8H-dibenzo[3,4:6,7]cyclohepta[1,2 - d] - 1,3 - dioxolan-8-ol are obtained. M.P. 215–217° C.

EXAMPLE 37

Cis-3a,12b-dihydro-2-[(4-phenyl-1-piperazinyl)methyl]-8H-dibenzo[3,4:6,7]cyclohepta[1,2-d]-1,3-dioxolan-8-ol 4.26 g. of cis - 3a,12b-dihydro - 2 - [(4 - phenyl - 1-piperazinyl)methyl] - 8H - dibenzo[3,4:6,7]cyclohepta [1,2 - d] - 1,3 - dioxolan - 8 - one in 120 ml. of anhydrous benzene are added slowly and stirring to 0.390 g. of $AlLiH_4$ suspended in 50 ml. of anhydrous $Et_2O$ and boiled for 8 hours. The reaction mixture is decomposed by adding ethyl acetate and water; then it is filtered. The solid precipitate which forms after evaporation of the solution is dissolved in 150 ml. of benzene. The clear solution is concentrated to 30 ml. volume and cooled. The precipitate is filtered and washed with $Et_2O$. 2.7 g. of cis-3a,12b-dihydro - 2 - [(4 - phenyl - 1 - piperazinyl)methyl] - 8H-dibenzo[3,4:6,7]cyclohepta[1,2 - d] - 1,3 - dioxolan-8-ol are obtained. M.P. 210–212° C.

What is claimed is:
1. A compound selected from a 3a,12b-dihydro-8H-dibenzo[3,4:6,7]cyclohepta[1,2 - d] - 1,3 - dioxolane compound having the formula

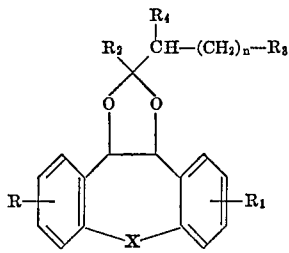

where X is selected from >C=O and >CHOH; R and $R_1$ are each hydrogen; $R_2$ is selected from hydrogen and alkyl; $R_3$ is selected from dialkylamine, pyrrolidine, piperidine, C - alkylpiperidine, C - dialkylaminopiperidine, C-carbalkoxypiperidine, hexamethylenimine, 3 - azabicyclo[3,2,2]nonane, morpholine, piperazine, N' - alkylpiperazine, N' - hydroxyalkylpiperazine, N' - phenylpiperazine, N' - benzylpiperazine, and N'-carbalkoxypiperazine; $R_4$ is selected from hydrogen, alkyl and phenyl; $n$ is a whole integer of from 0 to 2; and wherein an alkyl radical appearing in any of the substituents defining any of the R radicals is an alkyl radical of 1 to 4 carbon atoms; or a pharmaceutically acceptable acid addition salt thereof.

2. A compound of claim 1 which is a cis isomer of a 3a,12b - dihydro - 8H - dibenzo[3,4:6,7]cycloheptal[1,2-d]dioxolane.

3. A compound of claim 1 which is a trans isomer of a 3a,12b - dihydro - 8H - dibenzo[3,4:6,7]cyclohepta[1,2-d]dioxolane.

4. A compound of claim 1 wherein X is >C=O.
5. A compound of claim 1 wherein X is >CHOH.
6. A compound of claim 1 which is cis-3a,12b-dihydro-2 - [morpholinomethyl] - 8H - dibenzo[3,4:6,7]cyclohepta[1,2-d]-1,3-dioxolan-8-one.
7. A compound of claim 1 which is cis-3a,12b-dihydro-2 - (2 - piperidinomethyl) - 8H - dibenzo[3,4:6,7]cyclohepta[1,2-d]-1,3-dioxolan-8-one.
8. A compound of claim 1 which is cis-3a,12b-dihydro-2 - [β - (4 - methyl - 1 - piperazinyl)ethyl] - 8H - dibenzo[3,4:6,7]cyclohepta[1,2-d]-1,3-dioxolan-8-one.
9. A compound of claim 1 which is trans-3a,12b-dihydro - 2 - [(4 - methyl - 1 - piperazinyl)methyl] - 8H-dibenzo[3,4:6,7]cyclohepta[1,2-d]-1,3-dioxolan-8-one.
10. A compound of claim 1 which is trans-3a,12b-dihydro - 2 - [(4 - benzyl - 1 - piperazinyl)methyl] - 8H-dibenzo[3,4:6,7]cyclohepta[1,2-d]-1,3-dioxolan-8-one.

References Cited
UNITED STATES PATENTS

| 3,700,691 | 10/1972 | Wasson et al. | 260—340.3 |
| 3,711,518 | 1/1973 | Christy | 260—340.5 |
| 3,726,900 | 4/1973 | Fauran et al. | 260—340.9 |

OTHER REFERENCES

Buchanan et al.: J. Org. Chem., 26, 4295–9 (1961).

G. THOMAS TODD, Primary Examiner

U.S. Cl. X.R.

260—268 PC, 293.58, 326.5C A, 340.5; 424—248, 250, 267, 274, 278